United States Patent [19]

Vykukal et al.

[11] 4,046,262

[45] Sept. 6, 1977

[54] ANTHROPOMORPHIC MASTER/SLAVE MANIPULATOR SYSTEM

[75] Inventors: Hubert C. Vykukal, Los Altos; Reginald F. King, San Francisco; Wilbur C. Vallotton, Los Gatos, all of Calif.

[73] Assignee: The United States of America as represented by the Administrator of the National Aeronautics and Space Administration, Washington, D.C.

[21] Appl. No.: 436,313

[22] Filed: Jan. 24, 1974

[51] Int. Cl.² .............................................. B25J 3/04
[52] U.S. Cl. ................................ 214/1 CM; 2/2.1 A; 214/1 BC
[58] Field of Search ......................... 214/1 CM, 1 BC; 2/2.1 A

[56] References Cited

U.S. PATENT DOCUMENTS

| | | | |
|---|---|---|---|
| 3,047,167 | 7/1962 | Rose | 214/1 CM |
| 3,405,406 | 10/1968 | Vykukal | 2/2.1 A |
| 3,451,224 | 6/1969 | Colechia | 214/1 CM X |
| 3,543,947 | 12/1970 | Devol | 214/1 BC |
| 3,575,301 | 4/1971 | Panissidi | 214/1 BC |
| 3,804,270 | 4/1974 | Michaud | 214/1 BC X |

Primary Examiner—Albert J. Makay
Assistant Examiner—George F. Abraham
Attorney, Agent, or Firm—Darrell G. Brekke; John R. Manning

[57] ABSTRACT

An anthropomorphic master/slave manipulator system including master arm apparatus including a plurality of master tubular articulated portions which are coaxially adjacent one another and relatively rotatable, master transducing apparatus responsive to the relative rotation of the adjacent tubular portions and operative to provide a driving signal, slave arm apparatus including a plurality of slave tubular portions corresponding to those portions of the master arm apparatus, the slave tubular portions being coaxially adjacent one another and relatively rotatable, slave transducing apparatus responsive to the driving signal and operative to drivingly rotate the slave tubular portions through an angle that corresponds to the relative rotation of the corresponding master arm tubular portions, and a communication link between the master transducing apparatus and the slave transducing apparatus for applying the driving signal to the slave transducer.

26 Claims, 13 Drawing Figures

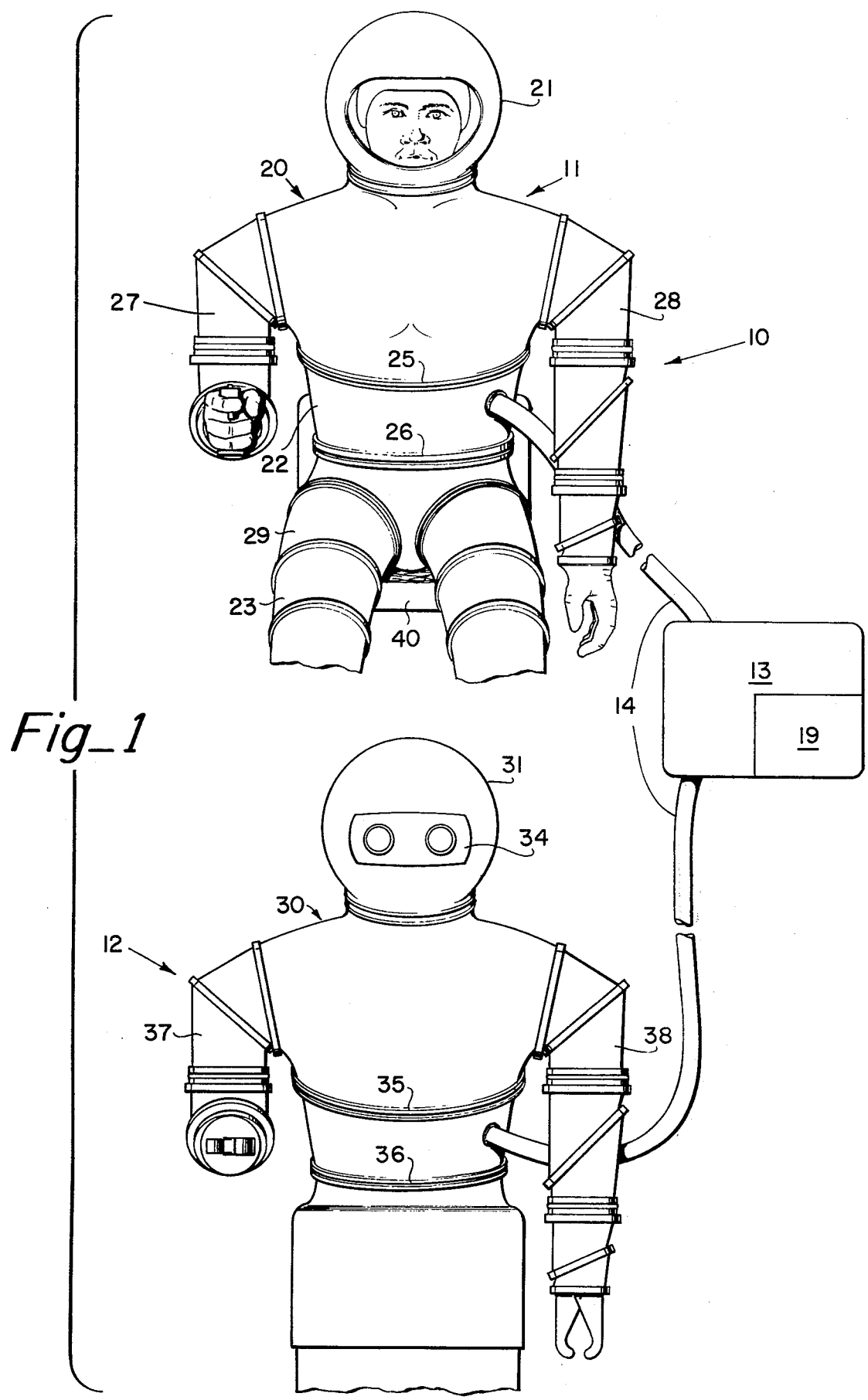
Fig_1

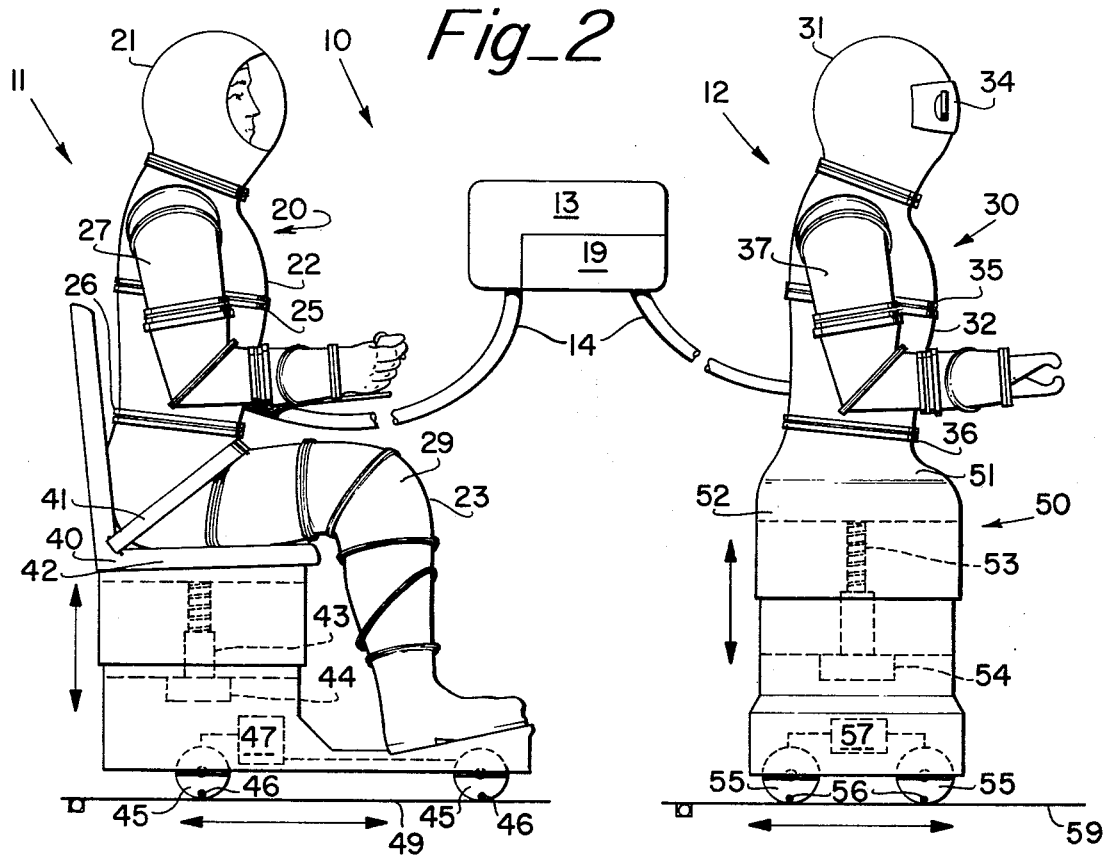
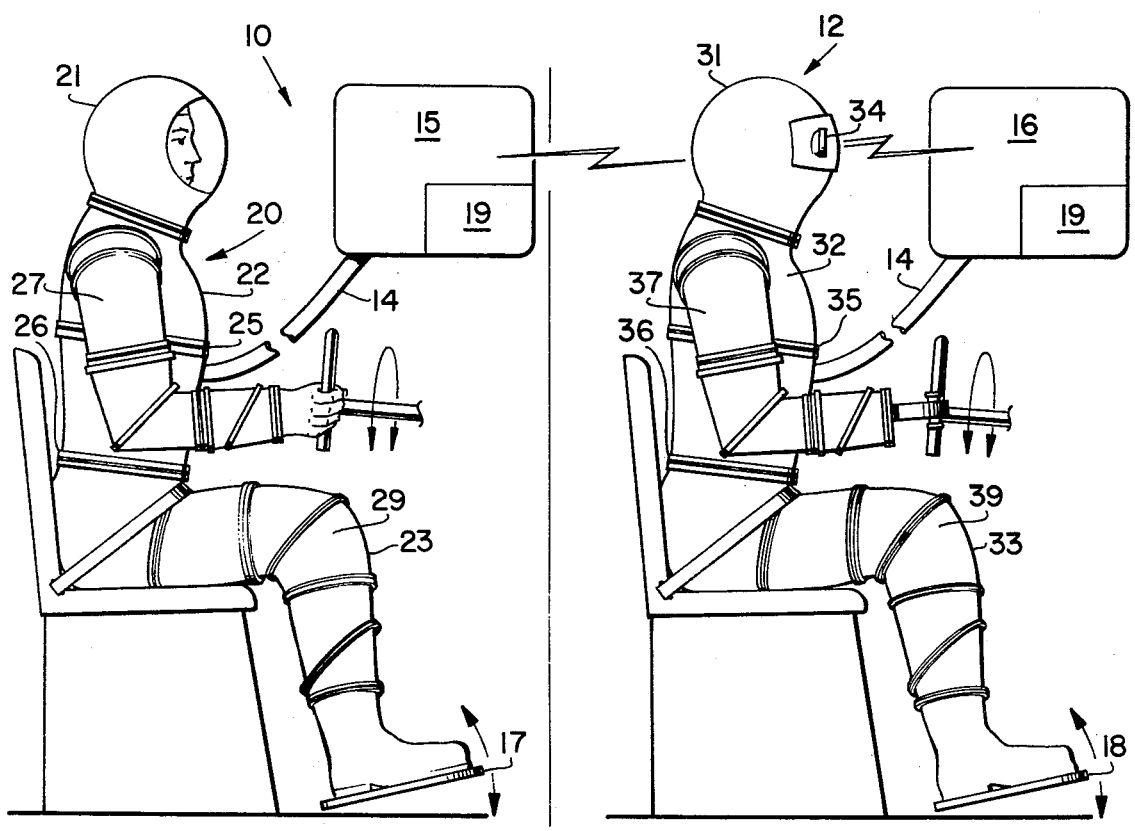

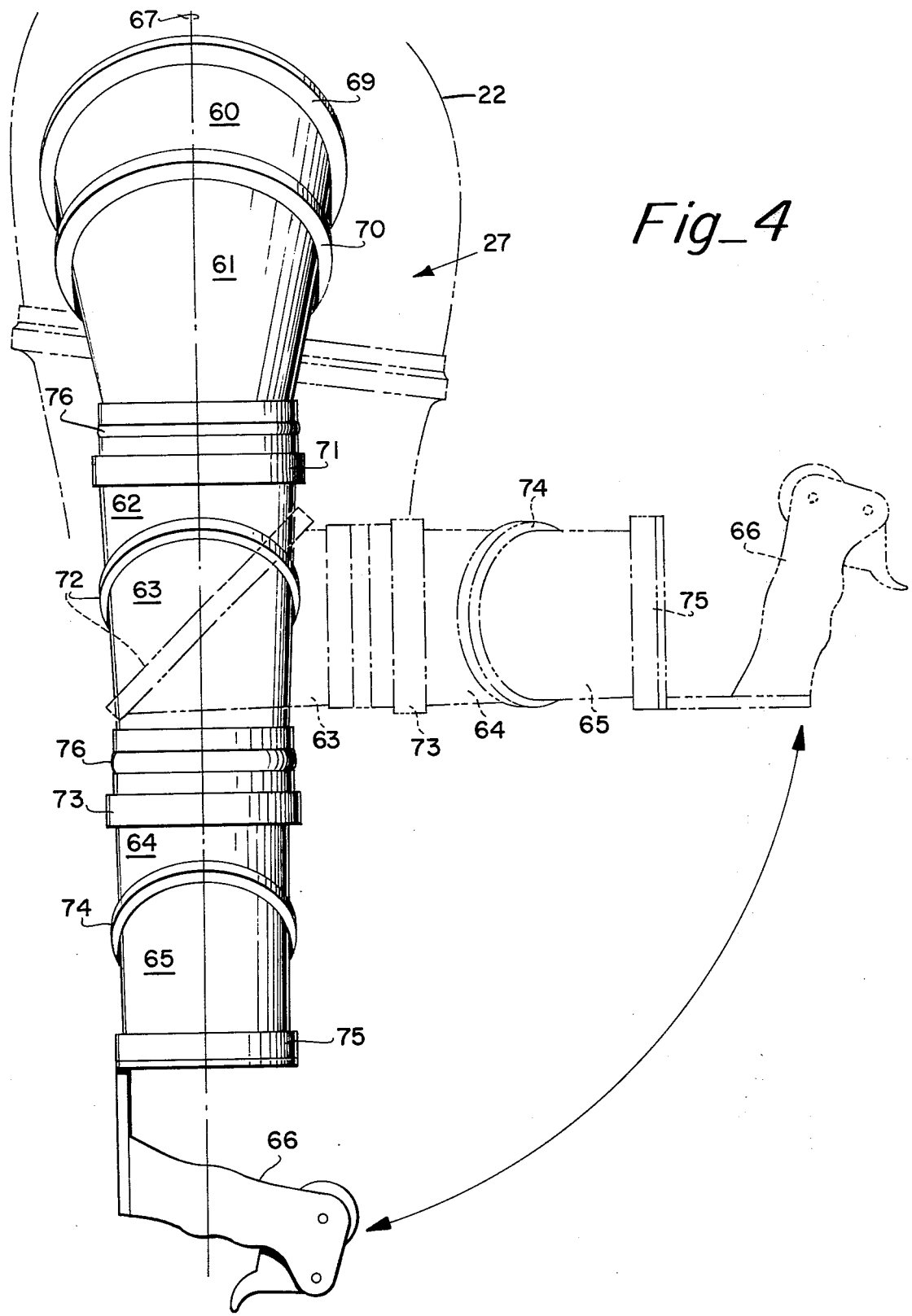
Fig_4

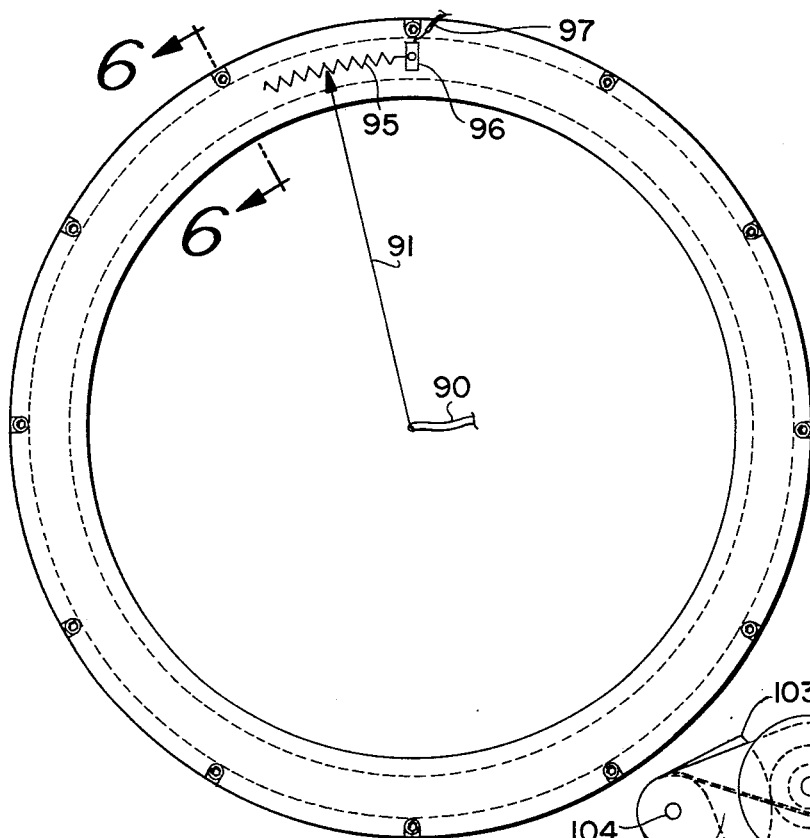
*Fig_5*
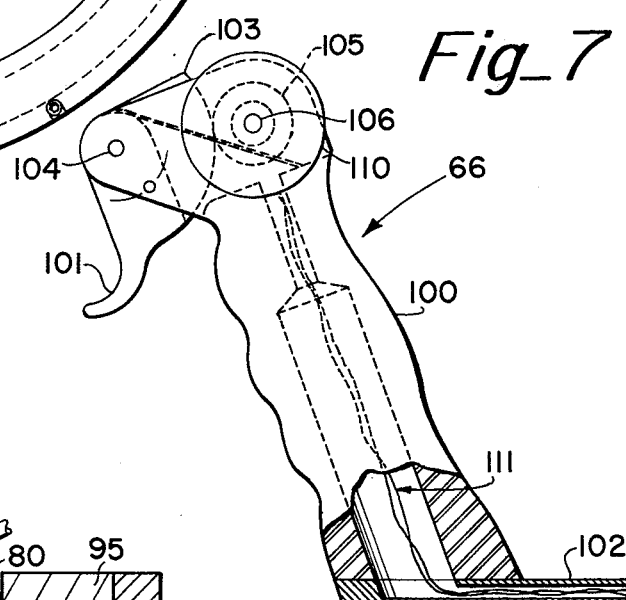
*Fig_7*
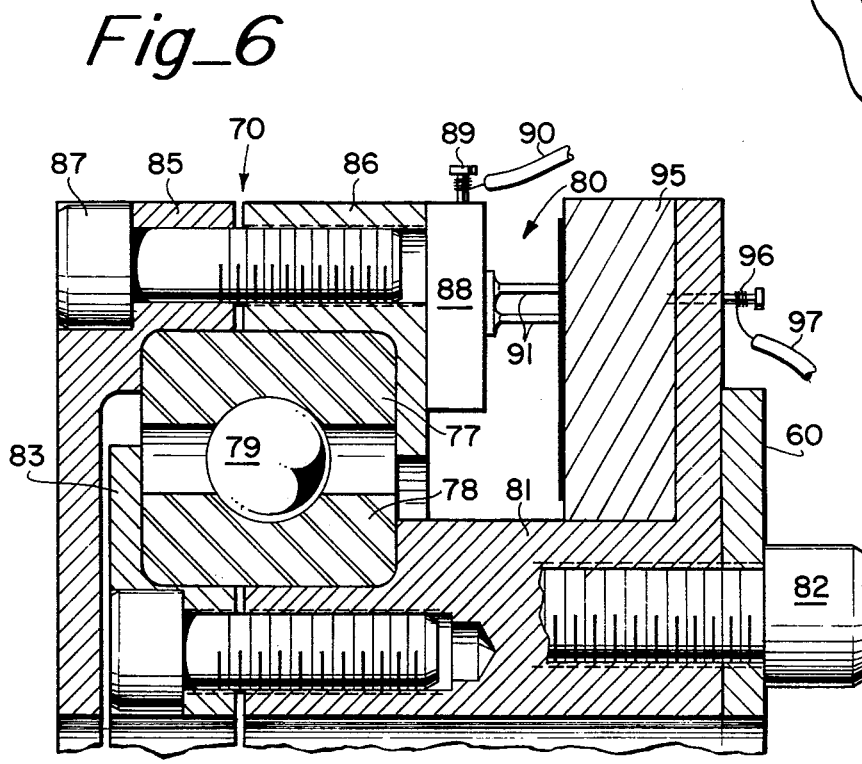
*Fig_6*

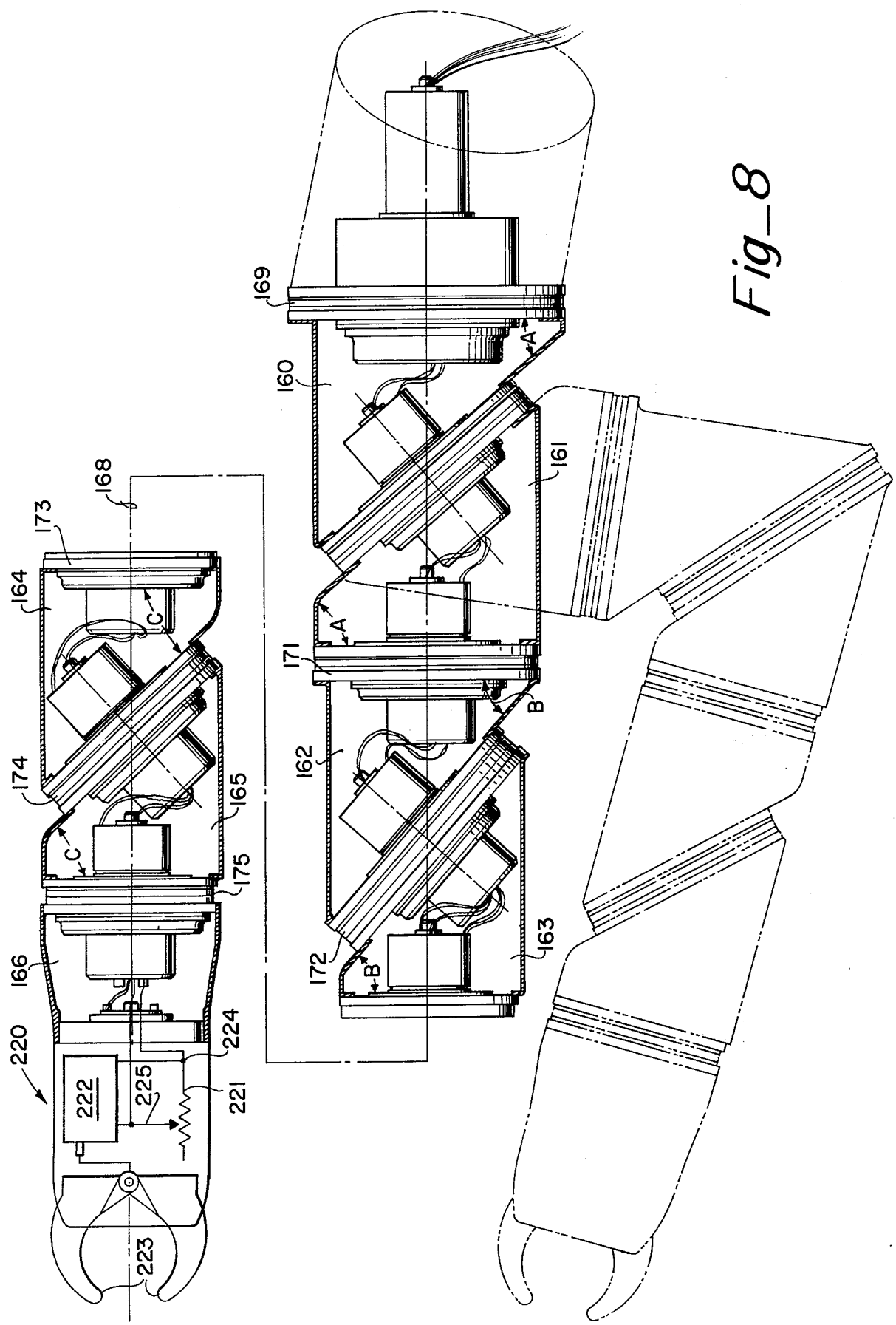
Fig_8

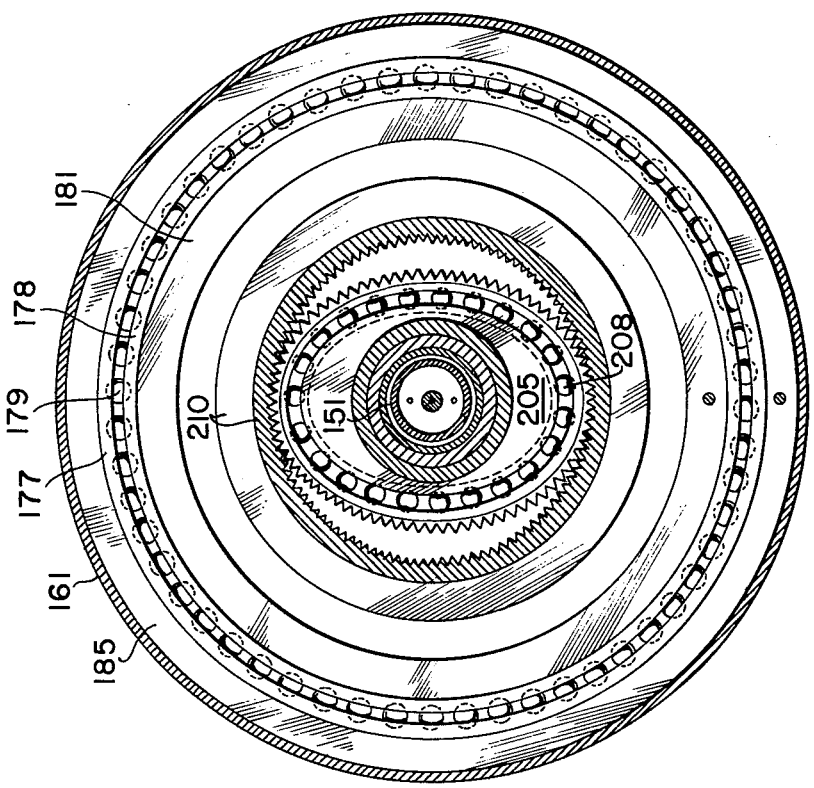
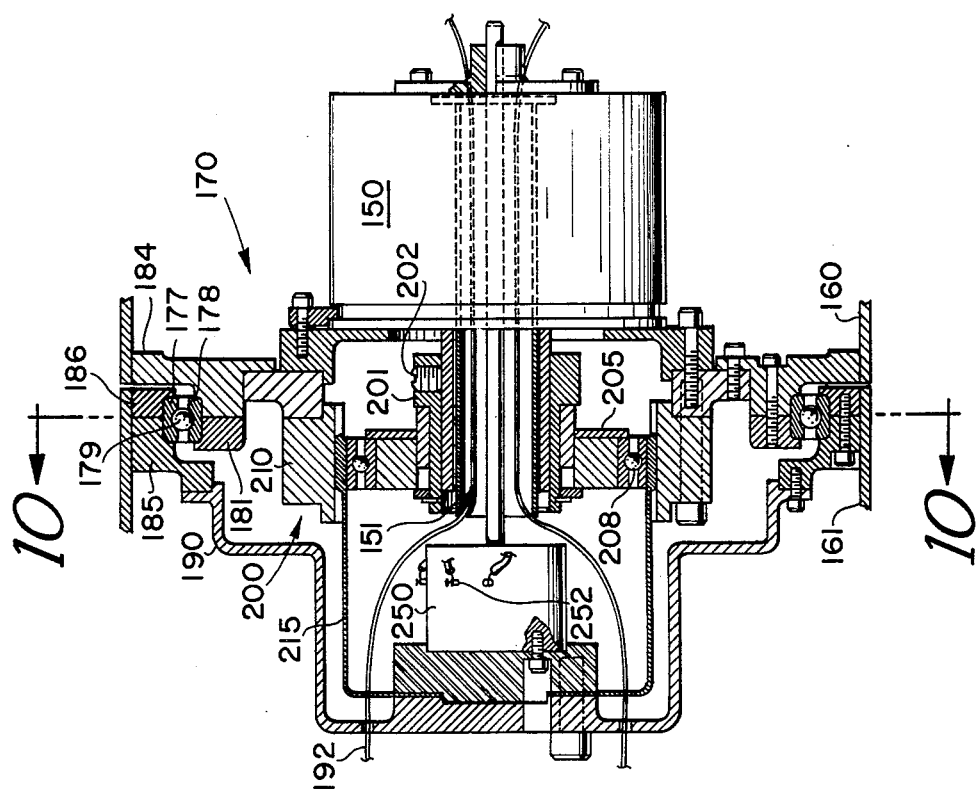
Fig_10
Fig_9

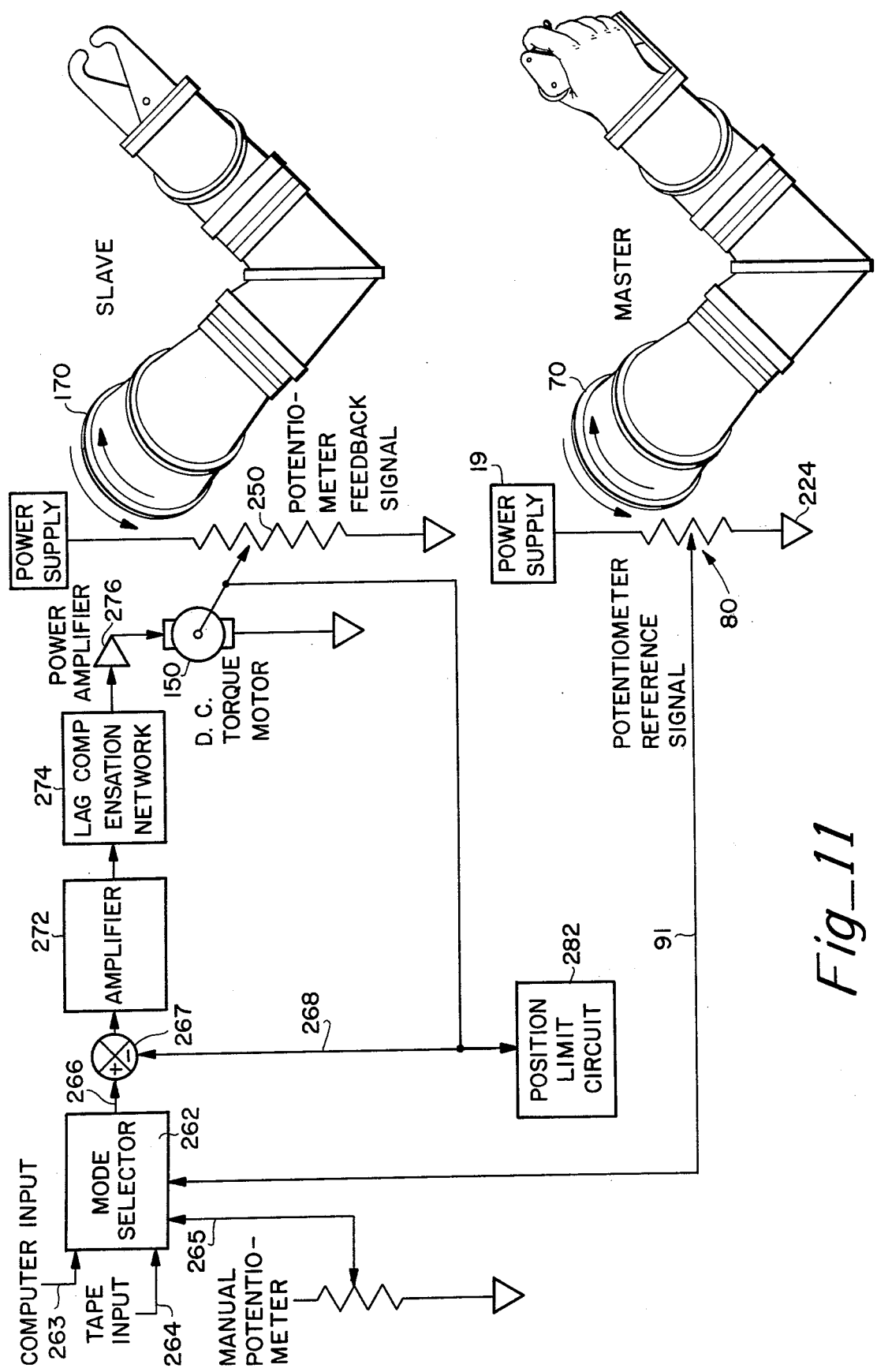

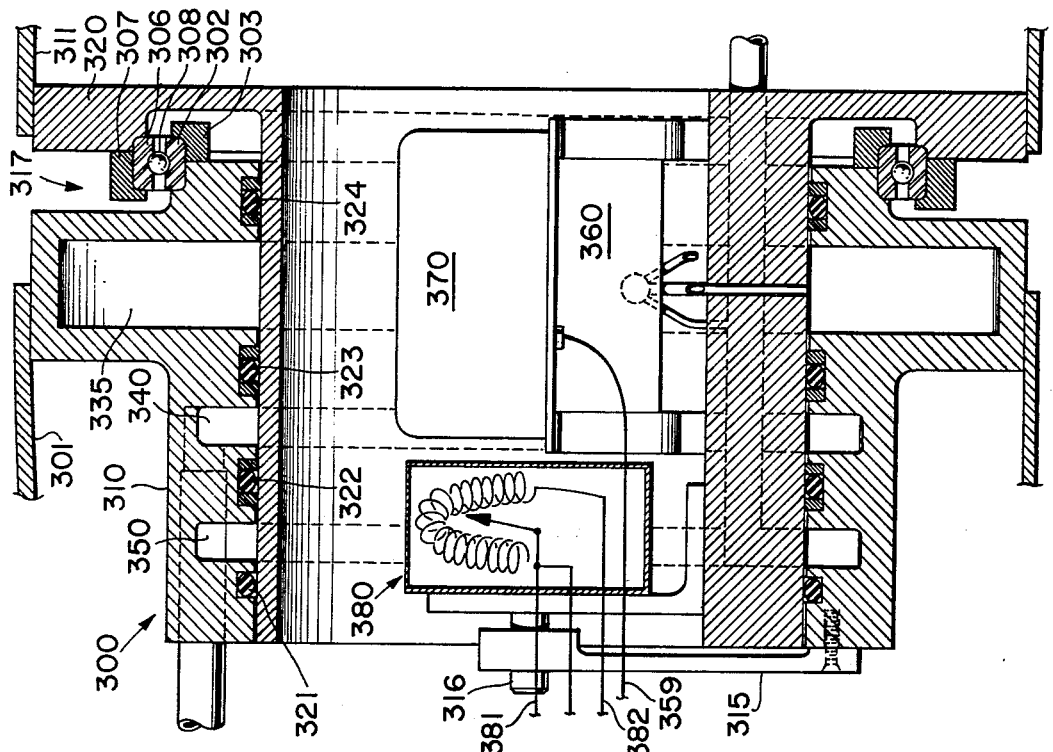
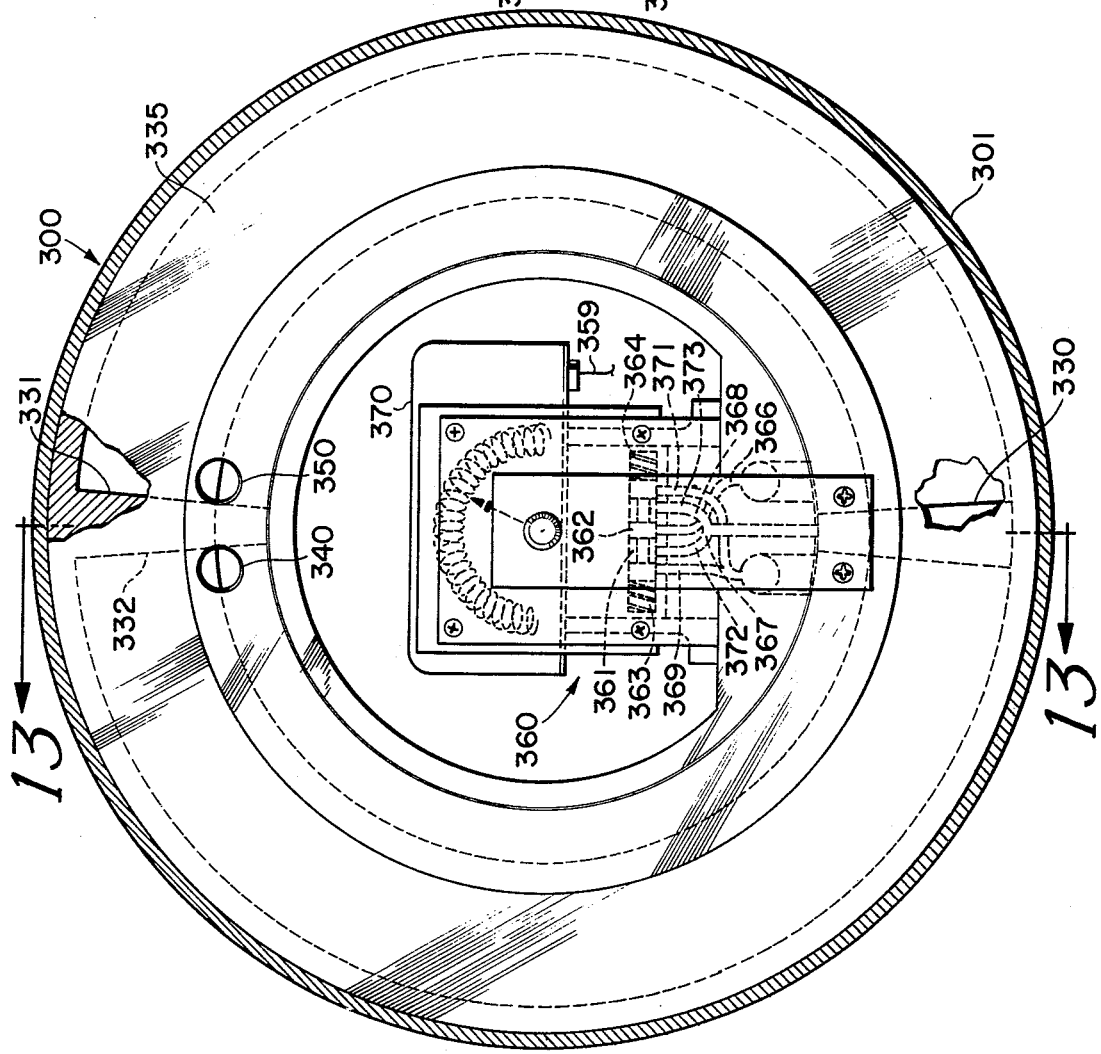

ANTHROPOMORPHIC MASTER/SLAVE MANIPULATOR SYSTEM

The invention described herein was made by employees of the United States Government and may be manufactured and used by or for the government for governmental purposes without the payment of any royalties thereon or therefor.

BACKGROUND OF THE INVENTION

1. Field of the Invention

The present invention relates generally to manipulator systems and more particularly to that class of anthropomorphic manipulator systems which includes a master unit and a slave unit.

2. Description of the Prior Art

For a decade, man has explored space, and to a limited degree another extraterrestrial body. However, knowledge of his place in the universe, and an understanding of the universe itself, has been overwhelmingly a result of his ability to extend his capabilities by the development of tools or machines which are extensions of himself. One method for extending man's abilities to carry out scientific and operational tasks in space is by means of remotely controlled machines, or teleoperators with manipulative capabilities. Although manipulator devices have been developed in the prior art, it is the purpose of this invention to provide an improved anthropomorphic master/slave manipulator system which simulates movements of a human limb at a remote location.

Teleoperators are terms generally designated to indicate man-machine systems, and include tongs used by the old-fashioned grocer to retrieve a cereal box from the top shelf or the mechanical hand that may repair some future nuclear-powered spaced vehicle. A teleoperator augments a normal man and communicates man's bodily dexterity across a barrier to mechanical actuators that can operate under loads too great for an unaided man, or in an environment too hostile, or too far away for him to conquer in person. The prefix "tele" in the teleoperator describes the ability of this class of man-machine systems to project man's innate dexterity not only across distance but through physical barriers as well. The teleoperator always has man in the control loop. Because of man's involvement in teleoperator systems the word anthropomorphic oftentimes arises in describing a particular system. Anthropormorphic is defined in Webster's Seventh New Collegiate Dictionary as being described or thought of as having a human form or with human characteristics. Also associated with teleoperators and the telemechanism field is the term "manipulator". The term manipulator was originated by Ray C. Goertz of the Atomic Energy Commission's Argonne National Laboratory and was originally applied to devices used to implement hot cell manipulation. Manipulators exclude walking machines and exoskeletons. Of particular interest to this invention is the master/slave concept which is generally applied to the common mechanical and electronic manipulators.

Prior art efforts at developing manipulator systems have been directed toward mechanically and electrically connected "unilateral" and "bilateral" manipulation. The term unilateral means that there is no kinesthetic or force feedback whereas bilateral means that there is this feedback to the master unit. For example, one such device is an underwater manipulator system of the type including a positional analog arm having a plurality of linked movable elements and a sensing and actuating system that causes the manipulator to move into crude positional correspondence with the analog arm. Another master/slave device is directed toward a cutaneous stimuli sensor and transmission network which provides pressure to an operator's cutaneous sense in a specific area of the master controller which is related to the pressure applied by a slave element on a point-to-point basis.

In addition, devices commonly known as "robots" have been constructed which crudely and slowly simulate man's movement. However, none of the prior art devices has proven satisfactory in accurately and smoothly positioning a slave member in response to the movement of a human limb or body.

Examples of prior art manipulator system can be found in U.S. Pat. No. 3,266,059, entitled: PRE-STRESSED FLEXIBLE JOINT FOR MECHANICAL ARMS AND THE LIKE, to Stelle, U.S. Pat. No. 3,414,136 entitled: UNDERWATER MANIPULATOR SYSTEM, to Moore et al., U.S. Pat. No. 3,535,711 entitled: CUTANEOUS STIMULI SENSOR AND TRANSMISSION NETWORK, to Fick, U.S. Pat. No. 3,580,099, entitled: ARTICULATING MECHANISM to Mosher, U.S. Pat. No. 3,587,872 entitled: MECHANICAL ARM AND CONTROL MEANS THEREFOR to Pauly, and U.S. Pat. No. 3,664,517 entitled: ARTICULATE MASTER/SLAVE MANIPULATOR to Germond et al.

In addition, references to teleoperator systems may be found in National Aeronautics and Space Administration publication, NASA SP-5047 entitled: "Teleoperators and Human Augmentation" by Edwin G. Johnsen and William R. Corliss, published December 1967 and also in the publication "Industrial Robots-A Survey" published by International Fluidic Service Ltd., Bedford, England.

OBJECTS OF THE INVENTION

It is therefore a principal object of the present invention to provide an anthropomorphic master/slave manipulator system for enabling a remote manipulator to be controlled by either a master, or a computer or preprogrammed computer tape.

Another object of the present invention is to provide a bilateral anthropomorphic master/slave manipulator system that accurately and smoothly simulates a human limb movement at a remote location.

Still another object of the present invention is to provide an anthropomorphic master/slave manipulator system that has a high frequency response, a high structural stiffness and a design that protects the components of the slave mechanism.

Still another object of the present invention is to provide an anthropormorphic master/slave manipulator system that enables a slave mechanism to simulate movements of a man when the slave mechanism is in outer space, underwater, in a hazardous environment such as in a high radiation area and, for example, simulates the equivalent ability, dexterity, and strength of the human arm.

SUMMARY OF THE INVENTION

In accordance with the present invention, a novel anthropomorphic master/slave manipulator system is provided including a master arm means including first and second master tubular portions, the tubular portions being coaxially adjacent one another and relatively rotatable, master transducing means responsive to the relative rotation between the first and the second tubular portions and operative to provide a driving signal, slave arm means comprising first and second slave tubular portions, the first and the second slave tubular portions being adjacent one another and relatively rotatable, slave transducing means responsive to the driving signal and operative to drivingly rotate the first slave tubular portion relative to the second slave tubular portion through an angle that corresponds to the relative rotation between the first and the second master tubular portions, and communication means linking the master transducing means and the slave transducing means for applying the driving signal to the slave transducing means, whereby rotation between the first and the second master tubular portions of the master arm means causes a corresponding rotation between the first and the second slave tubular portions of the slave arm means. Circular bearings interconnect the adjacent ends of the master and slave tubular portions to allow the relative rotation therebetween. Additional portions comprising the arm means are arranged such that three adjacent portions represent a joint of an arm or a leg of a human being.

Among the advantages of the present invention is that the master arm means when worn and manipulated by a human being allow the transmission of all degrees of motion of the shoulder, elbow, wrist, knee, and ankle joints of the wearer to be resolved into only rotation of respective conical segments in a slave unit manipulator mechanism.

Another important advantage of the present invention is that only simple rotary electromechanical drives are utilized in the slave unit.

Another advantage of the present invention is that each station or junction of articulated segments in the slave unit can be moved independently under the control of either a wearer of the master unit, or by a preprogrammed magnetic tape, or by a computer.

Other objects and advantages will be apparent to those skilled in the art after having read the following detailed disclosure which makes reference to the several figures of the drawings.

IN THE DRAWINGS

FIG. 1 illustrates an operative embodiment of the anthropomorphic master/slave manipulator system in accordance with the present invention.

FIG. 2 is a side view of the system illustrated in FIG. 1 and includes a schematic diagram of the carriage means for controlling movement of the slave unit.

FIG. 3 illustrates another operative embodiment of the anthropomorphic master/slave manipulator system in accordance with the present invention.

FIG. 4 is a schematic diagram of the arm portion of the master unit in accordance with the present invention with the arm in a bent position shown in phantom.

FIG. 5 is a plan view of a bearing assembly interconnecting adjacent segments of the arm portion of the master unit in accordance with the present invention.

FIG. 6 is a sectional view taken through lines 6—6 of the bearing assembly of FIG. 5.

FIG. 7 is a side elevational view with portions broken away of the trigger means of the arm portion of the master unit in accordance with the present invention.

FIG. 8 is a schematic diagram of the slave arm in accordance with the present invention with the slave arm in a bent position shown in phantom.

FIG. 9 is a cross-sectional view of a motor and a harmonic drive assembly for use in moving the slave arm illustrated in FIG. 8.

FIG. 10 is a sectional view taken through lines 10—10 of FIG. 9.

FIG. 11 is a schematic diagram in block form illustrating the electric circuit for transmitting movements of the master unit to the slave unit to cause corresponding movements in the slave unit.

FIG. 12 is a plan view of a hydraulic drive system for driving the slave arm illustrated in FIG. 8 in an alternative embodiment.

FIG. 13 is a sectional view of the hydraulic drive system taken through lines 13—13 of FIG. 12.

DETAILED DESCRIPTION OF THE PREFERRED EMBODIMENTS

Referring in more detail to the drawings, and in particular to FIGS. 1, 2 and 3, the anthropomorphic master/slave manipulator system, generally designated by the numeral 10, in accordance with the invention comprises a master unit 11, a slave unit 12, and a console or communication means 13 connected by cable 14 to interface units 11 and 12. The console 13 comprises the power supplies for supplying electric energy to the electronics and electromechanical components associated with the master and the slave units.

The master unit 11 comprises a master suit 20 which includes a transparent helmet 21, a torso portion 22 and a pants portion 23. The transparent helmet 21 of a material such as plexiglass is hermetically bonded to the neck opening at the top of the torso portion 22. The torso portion 22 includes a first bellows portion 25 which is expandable to allow the master suit to turn in response to a corresponding movement of the wearer. In addition, a second expandable bellows portion 26 allows the torso to bend in response to wearer-body movement. Arm covering portions 27 and 28 and leg covering portions 29 depend from the torso 22 and pants 23 portions, respectively. The walls of the limb covering portions are preferably made in a hard, rigid honey-comb design comprising inner and outer skins of glass fibre cloth spaced by separating ribs.

The slave suit 30, as illustrated in FIGS. 1-3, comprises a helmet 31, a torso portion 32 and a pants portion 33. The helmet 31 preferably houses a portion of a stereoscopic television system and apparatus generally designated by the numeral 34 although this is not a necessary feature of this invention. The stereoscopic television system includes a remote camera unit having means for projecting a pair of binocular images of a remote object through a common lens system onto the face of a television camera tube for transmission to a viewing unit at the master unit location which has a television picture tube. The stereoscopic viewer provides a three-dimensional selective scanning capability of a remote field of view. Thus, the remote images may be viewed by a viewer at a distant point enabling him to exercise a more precise control over actions of the slave unit. The particular details of construction of this stereoscopic apparatus have been omitted from this specification since these are the same as described in U.S. Pat. No. 3,670,097 entitled: "STEREOSCOPIC TELEVISION SYSTEM AND APPARATUS" invented by James L. Jones and this patent is incorporated by reference to this specification for any details not disclosed herein. The torso portion 32, similar to the corresponding torso portion 22 of the master suit, includes a first bellows 35 for allowing the slave unit to pivot in response to pivoting motion of the master unit and also a second bellows 36 for allowing bending responsive to bending motion of the master unit. Attached to the torso portion are arms 37 and 38 and attached to the pants portion 33 are legs 39.

Certain details of construction have been omitted from the description of the master suit 20 and the slave suit 30 since these are the same as disclosed in U.S. Pat. No. 3,405,406 and in U.S. Pat. No. 3,636,564 entitled: "HARD SPACE SUIT" and "SPACESUIT HAVING WAIST AND TORSO MOVEMENT", respectively, and invented by Hubert C. Vykukal and those patents are incorporated by reference to this specification for any details not disclosed herein.

It will be understood that in some remote locations only certain responses are desired and accordingly, only those necessary portions of the master suit 20 and the slave suit 30 are required. For example, in manipulating radioactive "hot cells", only arm movements are necessary to remotely control the movement of a gripper that handles the hot cell. Accordingly, only the arm portion 37 of the slave unit and the arm portion 27 of the master unit are required as well as the necessary communications equipment to transmit and receive signals therebetween and power supplies for energizing the associated arm driving assemblies.

As illustrated in FIG. 1 and in FIG. 2, the wearer of the master suit 20 is seated on a carriage or platform 40 and secured thereto as by straps 41 so as to fix him in a reference location on the seat 42. The carriage 40 comprises elevator means 43 which is preferably, and particularly illustrated as being, a hydraulic lift actuated by hydraulic motor 44, although it is recognized that a motor driven lead-screw device could be similarly utilized. The elevator means is operable to move the seat and thus the master unit vertically in an up or down direction. Wheels 45 which are attached to the carriage are actuated and driven by a motor 47 for propelling the carriage along ground plane 49 in either the forward, backward or lateral directions. Sensors 46 disposed in the wheels and on the ground sense the location of the carriage in a manner well known in the art so as to provide a measurement of the position of the carriage at all times with respect to a reference position, especially during movement. The carriage 40 has freedom of motion in up and down directions and in the plane of the ground or floor.

Similarly, a controlled carriage or platform 50 secures the torso portion of the slave unit thereto as by a bond 51 which may be epoxy, although welds or other appropriate bonds can be used such that the slave unit is bonded to seat 52. The slave unit is movable in a vertical direction through elevator means 53 shown to be hydraulically actuated by motor 54, although a lead-screw may be substituted therefor. Wheels 55 are attached to the platform to permit the platform to roll on ground plane 59, the wheels being driven by motor 57 and their position relatively sensed by sensors 56 so that the slave unit movements correspond to the movements of the master unit.

This anthropomorphic master/slave manipulator system is also utilized where the barrier is distance or space as exemplified by including a slave unit in a space ship or an airplane. In this environment, as illustrated in FIG. 3, in order to accelerate or decelerate the vehicle to the desired velocity, leg movements of the master on a control accelerator pedal 17 are sensed and communicated to the slave unit 12 which simulates the leg movements to apply the same accelerating force on slave accelerator pedal 18. Accordingly, as illustrated, the communication means 13 comprises a transmitter, generally designated by the numeral 15, and the power supplies associated with the master unit, which transmits information regarding movements of the master leg 29 to a receiver 16 associated with the slave unit. The receiver then decodes the information and produces an appropriate electrical signal to actuate the corresponding slave leg component to simulate the action of the master. The communication means 13 comprises the necessary transmitting, receiving, amplifying, power supplying coding and decoding systems, all of which are well known in the art and a detailed description of these systems is not included herein.

Although our invention includes an entire anthropomorphic master/slave manipulator system which simulates arm, leg, torso and head movements of a human being and which comprises master and slave units embodying the appropriate body portions, in our preferred embodiment the system comprises master and slave arm means and the necessary apparatus necessary to communicate arm motion of the wearer of the master arm to cause a corresponding motion in the slave arm unit. It is understood that the general tubular construction of the master and the slave arm unit is described in detail in the previously cited U.S. Pat. No. 3,405,406 and accordingly is not repeated herein. However, an important feature of our invention is the modification of the arm described in that patent to enable its use in our novel manipulator system comprising a master unit and a slave unit, which modification particularly required the incorporation of novel transducing means in the master and the slave units in order to sense and achieve the simulated movement.

Turning now to FIGS. 4-7, the construction of one of the sender arms as it relates to this invention is shown. Since the arrangement for each of the arms 27 and 28 is symmetrical, only the arrangement for arm 27 will be described in detail. As illustrated in FIG. 4, the sender arm is shown straightened in a schematic diagram as comprising a plurality of articulated segments or master tubular portions 60, 61, 62, 63, 64 and 65 that are adjacent to one another with portion 60 being adjacent and connected to the torso portion 22 of the master unit 11. Connecting the arm portion 60 to the torso portion 22 is a first shoulder bearing 69, connecting the arm portions 60 and 61 is a second shoulder bearing 70, connecting the arm portion 61 and 62 together is a first elbow bearing 71, connecting the arm portions 62 and 63 together is a second elbow bearing 72, connecting the arm portions 63 and 64 together is a third elbow bearing 73, and connecting the arm portions 64 and 65 together is a first wrist bearing 74. Second wrist bearing 75 connects tubular arm portion 65 to a trigger means 66. Each of the bearings is a circular bearing comprising an inner race, an outer race, a plurality of balls between the races, and a rotary potentiometer arranged around the periphery of the bearing. Annular adjusters 76 connected to bearings 71 and 73 provide give to the arm assembly. In the straightened position, all the tubular portions are coaxial around an axis 67 passing through the center of each portion. Moreover, the bearings which connect the ends of the arms adjacent to one another may each be considered as defining a plane. The planes through bearings, 69, 71, 73 and 75 are parallel to one another. The planes through bearings 70, 72 and 74 form angles of 42°, 50° and 35° respectively with the planes through the adjacent bearings and are best illustrated in FIG. 8. The diameter of the arms is chosen so as to fit over the arm of a human being. As illustrated in phantom view in dashed lines in FIG. 4, when the arm is bent at the elbow joint, the arm portions 62 and 63 rotate, the rotation of the portions becoming more substantial the sharper the elbow is bent.

Since all of the bearings are similar in basic construction, only the bearing 70 will be described in detail, as shown in FIGS. 5 and 6. Bearing 70 comprises a metal outer race 77, a metal inner race 78, a plurality of balls 79 and a potentiometer, generally illustrated by the numeral 80. The inner race 78 is held in a metal attachment ring 81 which is secured to the adjacent tubular section 60 by screws 82. The inner race 78 is held against movement in one direction by a snap ring 83 and is held against movement in the other direction by the attachment ring 81. An outer attachment member 85, associated with tubular portion 61, and a second attachment member 86 secured together by screw 87 holds the outer bearing race 77 in position. Bonded to the attachment member 86 is a portion of the potentiometer 80 including a wiper holding member 88 for rotatably carrying a pair of small cylindrically shaped conductive wipers 91 and having a terminal 89 extending radially away from the inner diameter of the bearing. Attached to terminal 89 are conductor leads 90 to couple the wipers 91 to the console unit 13 through cables 14. Bonded to the metal attachment ring 81 is a potentiometer element 95 which receives the distal ends of the wipers 91. Potentiometer component 95 is a thin annularly shaped resistive member, such as carbon, which extends around the periphery of the bearing 70. Another terminal 96 is fastened to a reference location on potentiometer element 95 and connected by a conductive lead 97 to ground connection within the console 13. The potentiometer 80 is well known in the art as a rotary potentiometer and exhibits a variable resistance depending upon the angular location of the wipers 91 with respect to the terminal 96. As the tubular portions 60 and 61 rotate the wiper moves around the potentiometer 95 thereby producing a varying resistance as a function of wiper position. The instantaneous resistance is sensed on leads 90 and 97 at the console 13.

Although not shown, appropriate seal members made of plastic material such as nylon or delrin may be included in the bearing so as to prevent hazardous material from entering the master suit. It is recognized that if the suit is used in a space environment, the pressure inside the suit is greater than outside so that the seal member must prevent air inside the suit from escaping. Furthermore, if the master/slave manipulator system is used in an underwater environment, the pressure outside the suit is greater than inside the suit, and accordingly, the seals must seal the bearing from the external water. When the seals are arranged in this manner, the bearing races and balls are never exposed to any vacuum environment or water environment existing on the outside of the suit. The seals are described in detail in U.S. Pat. No. 3,405,406.

Referring now to FIG. 7, the trigger means 66 is illustrated. The trigger means comprises a graspable handle portion 100 shaped to fit a human hand, a trigger portion 101, a rigid connecting portion 102 for connecting the handle 100 to the wrist bearing 75 whereby the trigger means is allowed to rotate relative to the tubular portion 65. The trigger portion 101 includes a hubless spur gear 103 so as to enable the trigger assembly to rotate about the dowel-pin shaft 104 disposed through the upper portion of the handle 100. The spur gear 103 is drivingly engaged with a gear 105 which rotates about a shaft 106 through the handle 100. Fixedly secured to the gear 105 is a rotary potentiometer 110. Accordingly, as a wearer of the master arm grasps the handle of the trigger means and applies pressure through his finger on the trigger 101, the hubless spur gear 103 rotates, thereby rotatably driving gear 105. As gear 105 rotates a wiper associated with potentiometer 110 correspondingly rotates, thereby changing the resistance between the output terminals 111 of the potentiometer 110 which are connected between the potentiometer and the console 13. This changing resistance is representative of a varying electrical signal at the output of this potentiometer and is designated as a hand-moving signal which, as will be described later, is communicated to the outermost hand-like portion of the slave arm means.

Referring now to FIG. 8 of the drawings, there is illustrated in a schematic diagram the slave/arm means of this invention in positions similar to that of the master arm. The arm is shown outwardly extended in a straightened position and in a bent position as illustrated in phantom view by dashed lines. The slave arm assembly comprises tubular portions 160, 161, 162, 163, 164, 165 and 166. With the arm in the straightened position, all of the tubular portions are coaxial about an axis 168 passing through the center of each portion. Many of the parts of the slave arm assembly are similar in construction to like parts in the master arm assembly described above, and accordingly there has been applied to each part of the slave arm assembly a reference numeral that differs by the reference numeral of the master arm assembly by 100. The adjacent tubular slave arm portions are separated by bearings 169, 170, 171, 172, 173, 174 and 175. Each of the bearings is circularly shaped, the bearings 169, 171, 173 and 175 being parallel to one another when the arm is extended and the bearings 170 and 172 and 174 forming angles A, B and C respectively to the adjacent bearings and having the same angular relationship as corresponding bearings of the master arm.

The fundamental difference between the slave arm assembly and the master arm assembly resides in the fact that each of the slave arm bearings house and carry slave transducing means that are responsive to electrical driving signals generated by the rotary potentiometer associated with the corresponding master arm bearing and are operative to convert the electric driving signal into a rotary mechanical motion so as to relatively rotate the slave tubular portions adjacent to the bearing. In the preferred embodiment the slave bearing includes a rotary position transducer and a DC torque motor.

Since each of the bearings 169 through 175 are similar in construction, the bearing 170 will be described in detail as illustrated in cross-sectional views in FIGS. 9 and 10. As illustrated therein, the bearing 170 houses a slave transducing assembly including a motor 150, a harmonic drive assembly 200, a potentiometer 250 and the appropriate electrical conductors. The bearing 170 comprises a metal outer race 177, a metal inner race 178 and a plurality of metal balls 179. The inner race 178 is held in a metal attachment ring 181 on one side and on the other by a rigid structural member 184 which is secured to the attachment ring 181 and to the motor 150. The motor includes an axially extending output shaft 151.

The outer race 177 is held on one side by an outer rigid ring 186 and on the other by an L-shaped bracket 185 which is secured to the outer attachment ring 186. The bracket is secured to an annular housing member 190 so as to enclose the harmonic drive assembly 200.

The harmonic drive assembly comprises a rigid circular spline 210, a flexspline 215 and a wave generator 205. The circular spline 210 mates with the flexspline at two equally spaced points of their circumferences. The flexspline 215 is cup-shaped and flexible and is deflected at two points of its circumference by the wave generator 205 into an advancing wave form. The wave generator 205 is an elliptoidal cam with antifriction bearings 208 which rotates and deflects the flexspline into its advancing wave form. Teeth which operate as splines on the respective adjacent peripheries of the flexspline and the circular spline are cut to the same circular pitch but the smaller diameter flexspline has fewer teeth than the circular spline.

A hub assembly 201 is carried by the motor shaft 151 and secured thereto by screws 202. The hub assembly is attached to the rotatable wave generator 205.

The outer spline 210 is secured to the rigid structural member 184 so as to enable the inner race 178 to rotate when the spline 210 is rotatably driven. The flexspline 215 is secured to the housing member 190 and thus coupled to the outer race 177 through bracket 185.

The elliptical shape of the wave generator 205 is best seen in FIG. 10. As shown, the wave generator 205 is engaged at its major diameter with the flexspline 215 and with the circular outer spline 210. Also secured to the motor shaft 151 is the rotary potentiometer 250 which develops a feedback signal indicative of the actual rotation between the adjacent slave arm portions 160 and 161. The potentiometer 250 includes a rotatable wiper and an end terminal 252 disposed on an annular resistive element so as to provide an indication of the resistance therebetween, the resistance representing the relative rotation between adjacent slave tubular portions 160 and 161.

In operation, as a driving signal from the console 13 is supplied to the motor 150, the motor shaft 151 is caused to rotate in a direction dependent upon the polarity of the voltage. This causes the hub assembly 201 and the wave generator 205 which are tied to the shaft to rotate and transfers a continuously advancing wave form to the flexspline 215, which rotates with a greatly reduced tangential motion in the opposite direction. In addition, rotation of shaft 151 causes the resistance of the rotary potentiometer 250 to vary which in turn produces a varying feedback voltage. The feedback voltage is compared to the driving signal from the master transducer in a servo system as will be discussed hereafter.

An important feature of this invention is the hollowing out of the motor shaft 151. Since the shaft is hollow all power and control leads or conductors for the entire slave arm are threaded therethrough and out apertures 192 in the housing 190. Thus, the need for special slip rings and commutators to transmit electrical energy continuously through each bearing interconnection is eliminated. It should be recognized that the rotation of slave bearing 170 occurs in response to the rotation of the corresponding master bearing 70. Thus, the electrical connections between the two bearings are independent of the connections between other bearing assemblies. In addition, since some of the electrical connections terminate at each of the bearings, fewer conductors pass through the outermost portions of the arm.

In harmonic drives it is well known that the relative rate of rotation between the hub assembly and the bearing is determined by the number of teeth in the flexspline and in the circular spline. In the preferred embodiment of our invention the teeth are chosen to provide us with a 160:1 ratio. The preferable harmonic wave drive assemblies are those manufactured by United Shoe Machinery Corp. and designated by them as Models HDC-3C and HDC-5C which we have modified by enlarging the input hub to the wave generator to receive the larger hollow shaft from the DC motor.

Referring again to FIG. 8, end effector means 220 are attached to the outermost slave tubular portion 166. As shown, the end effector means 220 comprise a linear potentiometer 221, a motor 222, and a pair of lever-like hand means or jaws 223 which are coupled to the output shaft of the motor 222. One terminal of the linear potentiometer is connected to ground 224 and the wiper 225 of the potentiometer is connected to the console 13 for receiving the hand-moving signal from the trigger means 66. Thus, as the pressure on the trigger 101 of the trigger means 66 varies, the hand-moving signal is caused to vary in response thereto which changes the resistance across potentiometer 221, thereby changing the driving voltage applied to linear motor 222. Since the hand means 223 are coupled to the output shaft of the linear motor, the hands open and close in response to the varying voltage. Preferably, the hand means is one such as that commercially available from MB Associates, Model 011650, Type B, although several other models are also available from that company and have been used in this system.

The operation of this master/slave manipulator system is best described in reference to the schematic electrical diagram in block form of FIG. 11 which illustrates the basic electronic blocks for transmitting movement of the master unit to the slave unit to cause corresponding movements in the slave unit. In order to simplify the diagram only one master potentiometer 80 is shown associated with one of the bearings 70 in the master arm means, although it should be recognized that there is a potentiometer associated with each master bearing as well as with every other parameter that is sensed such as with the carriage assembly and with the trigger means. Since the movement of any element of the master unit produces a corresponding movement in the slave unit that is independent of the movement of the other master elements, the entire slave unit is achieved with a plurality of parallel interconnections. The potentiometer 80 has one end connected to the power supply 19 which, for convenience is located in the console 13 of the master unit and the other end connected to ground 224. The wiper 91 of the potentiometer is connected to a mode selector device 262 which includes a switching network for selecting the mode of operation used to transmit the signals to cause movements in the slave arm assembly. The voltage signal supplied by the wiper 91 of potentiometer 80 as previously described is proportional to the angle that the respective adjacent tubular portions of the master arm unit have moved. Also applied to the mode selector 262 are conductors 263, 264 and 265 from a computer, a tape recorder, and a manual potentiometer, respectively, such that an operator can, by throwing the desired switch, choose which mode or input signal to use to transmit information to the slave unit. The output conductor 266 of the mode selector is applied to a summing junction or summing amplifier 267 which also receives a feedback signal on conductor 268 from the rotary potentiometer 250 associated with the corresponding bearing 170 in the slave arm unit. The summing junction is serially connected to an amplifier 272, a lag compensation network 274, a power amplifier 276 and a DC torque motor 150. The summing amplifier 267 compares the input signal from the mode selector 262 and the feedback signal from the potentiometer 250 and develops an error signal which is applied to amplifier 272 which amplifies this error signal. This amplified signal is applied to the lag compensation network 274, the power amplifier 276, and the DC torque motor 150 in the slave arm unit for relatively rotating the adjacent tubular portions 60 and 61. The lag compensation network 274 is chosen to have a transfer function that enables the system to overcome static and coulomb friction problems which traditionally hinder the obtaining of resolution and repeatability in closed loop positional servo systems. Accordingly, the lag compensation network increases the DC stiffness of the system and decreases the effect that any load disturbances would have. In addition, a position limiter circuit 282 has been included in the feedback path from potentiometer 250 for comparing the feedback signal from the slave bearing 70 with two preselected position reference signals to insure that the system remains within an acceptable range of operation. If the slave feedback signal is greater than the higher one of the two predetermined reference signals, the unit shuts off as it does if the signal is lower than the lower of the two predetermined signals.

The summing junction 267 is preferably a differential amplifier which differentially sums the signals from the master position transducer and the slave position transducer. The power amplifier and summing junction amplifier are preferably housed in one unit such as that manufactured by the Control Systems Research Co., Model PMA 200-S.

Accordingly, there has been described an anthropomorphic master slave manipulator system comprising master and slave arms, each of the arms formed by tubular portions, each tubular portion being adjacent one another and connected by a bearing so that the portions are relatively rotatable. In each of the tubular portions the planes defined by the two ends are perpendicular to and transverse to a central axis so that three adjacent portions of the master arm means and the associated bearings represent a joint of a human being. In the master arm each bearing includes a rotary potentiometer which provides a driving signal representative of the angular displacement between the adjacent tubular portions. Accordingly, when the wearer dons the master suit or the master arm and moves his arm, the movement of the joint causes driving signals to be produced in the transducing means associated with the three bearings representing that joint. These signals are each applied to the console and thereafter through the appropriate communication means to the slave transducing means which comprises circular bearing assemblies corresponding to those of the master arm means. These signals, after amplification and phase control connections cause the torque motor to move each of the respective slave arm tubular portions an angle corresponding to the movement of the master arm means. A feedback signal indicative of the actual rotation between adjacent tubular portions provides a continuous control on the DC torque motor.

In another embodiment of this master/slave manipulator system, the DC torque motor can be replaced with a hydraulic drive assembly comprising a hydraulic motor and a servovalve. In this alternative embodiment, as in all hydraulic systems, a greater force can be produced over the corresponding electrical motor arrangement so as to make it more desirable for high load assembly line manipulations. However, the electric system is cleaner and provides less contaminants than the hydraulic system.

Referring now to FIGS. 12 and 13, the hydraulic drive assembly for use in this alternative arrangement for rotatively driving the adjacent slave tubular portions is illustrated. The assembly comprises a housing 300 having a first portion 310, a second portion 320 that is relatively rotatable with respect to the first portion 310, a rotatable vane 330 for driving portions 310 and 320, a fluid supply system having a supply path 340 and a return path 350, a servo valve 360 for selectively supplying fluid to drive the vane 330, a control motor 370 for controlling the operation of valve 360, and a potentiometer 380 for sensing the angular movement between the portions 310 and 320 and for providing an electrical feedback signal to the summing amplifier.

The rigid first portion 310 is substantially annular in shape and includes an axial portion having a larger diameter defining a chamber 335 therearound, the chamber being closed by barriers 331 and 332. The second portion 320 is mounted within the central opening of the first portion and includes an outwardly extending vane 330 which fits within the chamber 335 of the portion 310 and is rotatable between the two barriers 331 and 332. Secured around the outer periphery of the stationary and rotatable portions respectively, are adjacent slave tubular arm portions 301 and 311. The housing portions are rotatable about bearings 317 and separated from one another by a rigid frame member 315. The bearings 317 are circular and comprise an outer race 306, an inner race 302 and a plurality of metal balls 308. The metal inner race 302 is secured to the portion 310 by a metal ring 303. The metal outer race 306 is held in position by an attachment ring 307 which is attached to portion 320.

The fluid supply path 340 and the return path 350 each include annularly shaped slots around the inner periphery of the portion 310 and supply and return lines communicating with a fluid reservoir (not shown). O-ring seals between the portions 310 and 320 are preferably employed as at 321, 322, 323 and 324 in FIG. 13. The potentiometer 380 includes a wiper 381 and a terminal 382 and is rotatably mounted on shaft 316.

The servo valve 360 includes an inner cylinder 361, a spool 362, and limit springs 363 and 364 for controlling spool displacement. Five ports let fluid into and out of the cylinder 361; a pressure port 366, actuator or cylinder ports 367 and 368 and tank ports 369 and 371. The pressure port 366 is connected by tubing in the supply path 340, the control port 367 is connected by tube 373 to the chamber 335 on the other side of vane 330, and the tank ports 369 and 371 are connected together in the return path 340 of the fluid system.

In operation, the control motor 370 receives electric current from the console 13 on conductors 359 and drives the spool 362 laterally within the cylinder 361, the direction of movement being determined by the polarity of the current. If the spool moves to the right then fluid enters the cylinder through the pressure port 366 and is let out through control port 367 into chamber 335, forcing the vane 330 to move around the chamber, thereby causing the portion 320 of the housing to rotate. As the vane is moved, excess fluid is trapped between the vane and the limit barrier, which excess is exhausted through tube 373 into control port 368 and out the tank port 371 in the return path. Similarly, if the spool is moved to the left, fluid enters the cylinder through pressure port 366, is exhausted through control port 368, forces the vane to rotate in the other direction which forces fluid through tube 372, into control port 367 and out of tank port 369 in the return line 350, whereby the portion 320 is caused to rotate in the other direction. In accordance with this embodiment the adjacent tubular portions of the slave arm are relatively rotatable. As the portion 320 of the housing relatively rotates about shaft 316, the resistance between the wiper 381 and the terminal 382 of rotary potentiometer 380 correspondingly changes providing a feedback signal indicative of the resistance change which is fed back to the summing junction to control the relatively rotation of the adjacent slave arm portions. Preferably, the servo valve used in this alternative embodiment is the Moog Type 30 servo valve.

From the above, it will be seen that there has been provided wan anthropomorphic master/slave manipulator system which fulfills all of the objects and advantages set forth above.

While there has been described what are at present considered to be the preferred embodiments of the invention, it will be understood that various modifications may be made therein and it is intended to cover in the appended claims all such modifications as fall within the true spirit and scope of the invention.

What is claimed is:

1. A master/slave manipulator system, comprising:
    master arm means including first and second master tubular portions, each master tubular portion defining an axis centrally therethrough, said first and said second master portions each having a first end lying in a plane substantially perpendicular to the axis of the respective portions and a second end lying in a plane transverse to the plane defined by said first end, said second ends being adjacent one another such that when said first ends are parallel to one another the respective axes are colinear, said first and said second master portions being relatively rotatable at said adjacent second ends;
    master transducing means responsive to the relative rotation between said first and said second tubular portions and operative to provide a driving signal;
    slave arm means comprising first and second slave tubular portions, each slave tubular portion defining an axis centrally therethrough, said first and said second slave portions each having a first end lying in a plane substantially perpendicular to the axis of the respective portion and a second end lying in a plane transverse to the plane defined by said first end, said second ends being adjacent one another such that when said first ends are parallel to one another the respective axes are colinear, said first and said second slave portions being relatively rotatable at said adjacent second ends;
    slave transducing means responsive to said driving signal and operative to drivingly rotate said first slave tubular portion relative to said second slave tubular portion through an angle that corresponds to the relative rotation between said first and said second master tubular portions; and
    communication means linking said master transducing means and said slave transducing means for applying said driving signal to said slave transducing means;
    whereby rotation between said first and said second master tubular portions of said master arm means causes a corresponding rotation between said first and said second slave tubular portions of said slave arm means.

2. The master/slave manipulator system as recited in claim 1 wherein said first and said second ends of said first and said second master tubular portions are circularly shaped and said adjacent second ends are coaxial, and wherein said first and second ends of said first and second slave tubular portions are circularly shaped and said adjacent second ends are coaxial.

3. The master/slave manipulator system as recited in claim 2 wherein said master are means further comprises a third master tubular portion having a first end that is adjacent to and relatively rotatable with respect to said first end of said second master portion; and
    wherein said slave arm means comprises a third slave tubular portion having a first end that is adjacent to and relatively rotatable with respect to said first end of said second slave portion, said three adjacent portions of said master arm means representing a joint of a limb of a human being, the relative rotation between the three portions simulating the motion of the joint, so as to allow said master arm means to affect movement simulating that of the human limb;
    said master transducing means responsive to the relative rotation between each of said adjacent master tubular portions and operative to provide a plurality of driving signals, each of said driving signals representative of the rotation between one set of adjacent master tubular portions;
    said slave transducing means responsive to each of said plurality of driving signals and operative to drivingly rotate the corresponding set of adjacent slave tubular portions through the same angle as that making said master transducing means respond;
    whereby said slave arm means provides a movement simulating the movement of said master arm means.

4. The master/slave manipulator system as recited in claim 3 wherein said master arm means further comprises a fourth master tubular portion having a first end adjacent to said first end of said first master tubular portion, said fourth master tubular portion being coaxial with and relatively rotatable with respect to said first end of said first master tubular portion, and wherein said slave arm means further comprises a fourth slave tubular portion having a first end adjacent to said first end of said first slave tubular portion, said fourth slave tubular portion being relatively rotatable with respect to said first end of said first slave tubular portion;
    said four adjacent portions of said master arm means representing two joints of a limb of a human being, the relative rotation between the four portions simulating the motion of the two joints, so as to allow said master arm means to affect movement simulating that of the human limb, said slave arm means providing a movement simulating the movement of said master arm means.

5. The master/slave manipulator system as recited in claim 3 wherein each of said plurality of driving signals generated by said master transducing means is independent of one another.

6. The master/slave manipulator system as recited in claim 3 wherein said master arm means comprises a plurality of adjacent master tubular portions to represent the shoulder and the elbow and the wrist joints of the arm of a human being, and wherein said slave arm means comprises a plurality of adjacent slave tubular portions corresponding to those portions of said master arm means, thereby to simulate movement of said master arm means.

7. The master/slave manipulator system as recited in claim 3 wherein said three adjacent portions of said master arm means are disposed to receive a joint of a human leg and move in response to motion of said joint.

8. The master/slave manipulator system as recited in claim 1 wherein the outermost portion of said master arm means comprises trigger means responsive to pressure thereon and operative to provide a hand-moving signal, and wherein the outermost portion of said slave arm means comprises movable hand means responsive to said hand-moving signal and operative to open and close said hand means in a lever-like manner such that the position of said hand means follows the pressure exerted on said trigger means.

9. The master/slave manipulator system as recited in claim 8 wherein said trigger means comprises a graspable handle portion and a trigger portion, said trigger portion responsive to pressure thereon and operative to provide said hand-moving signal.

10. The master/slave manipulator system as recited in claim 1 wherein said master transducing means comprises a rotary position transducer.

11. The master/slave manipulator system as recited in claim 10 wherein said rotary position transducer is a rotary potentiometer having a first portion associated with a reference location on said second end of said first master tubular portion and having a second portion movably associated with said second end of said second tubular portion, said potentiometer portions being responsive to relative rotation between said first and said second master tubular portions and operative to provide a driving signal representative of said relative rotation.

12. The master/slave manipulator system as recited in claim 1 wherein said slave transducing means comprises a motor responsive to said driving signal and operative to drivingly rotate said second slave tubular portion relative to said slave first tubular portion.

13. The master/slave manipulator system as recited in claim 12 wherein said slave transducing means comprises means for amplifying said driving signal, lag compensation network means for adjusting the phase of said amplified signals, and power amplifying means for amplifying said phase adjusted signal and for applying said amplified phase adjusted signal to said motor.

14. The master/slave manipulator system as recited in claim 13 and further comprising feedback means responsive to the relative rotation between said first and said second slave tubular portions and operative to provide an error signal; and
comparator means responsive to said error signal and said driving signal and operative to provide an error corrected driving signal to said amplifying means.

15. The master/slave manipulator system as recited in claim 12 wherein said motor includes a rotatable shaft and further comprising gear reducing means responsive to the rotation of said motor shaft and operative to drivingly rotate said first and said second slave tubular portion at a rate different from the rate at which said motor rotates.

16. The master/slave manipulator system as recited in claim 15 wherein said gear reducing means is operative to reduce the rate of rotation of the motor shaft by a ratio of 160:1.

17. The master/slave manipulator system as recited in claim 15 wherein said gear reducing means comprises a rotatable wave generator portion associated with said motor shaft, a driveable rigid outer circular portion coupled to said second end of said second slave tubular member and driven by said wave generator, and a flexible flexspline portion coupled to said wave generator portion and in engagement with said rigid circular portion and operative to relatively rotate said second end of said first slave tubular portion, whereby rotation of said motor shaft rotates said wave generator, whereby to cause relative rotation between said adjacent second ends of said first and said second slave tubular portions.

18. The master/slave manipulator system as recited in claim 12 wherein said motor is a hydraulic motor.

19. The master/slave manipulator system as recited in claim 1 wherein said communication means comprises conducting means for interconnecting said master arm means and said slave arm means.

20. The master/slave manipulator system as recited in claim 19 wherein said communication means further comprises power supplies for providing energy to said master transducing means and said slave transducing means.

21. The master/slave manipulator system as recited in claim 1 wherein said communication means comprises a transmitter disposed proximate said master arm means responsive to said transmitted driving signal and operative to apply said driving signal to said slave transducing means.

22. The master/slave manipulator system as recited in claim 1 and further comprising limiting means responsive to the relative rotation between said first and said second slave tubular portions and operative to limit movement to a preselected angle.

23. A master/slave manipulator system comprising:
master arm means including a first tubular portion and a second tubular portion adjacent said first tubular portion, a first circular bearing comprising a plurality of balls engaged between an outer circular race and an inner circular race, first and second rings, said outer and said inner races being connected to said adjacent first and second portions, respectively, by said first and second rings, respectively, whereby said adjacent portions are relatively rotatable;
master transducing means responsive to the relative rotation between said adjacent portions and operative to provide a driving signal;
slave arm means comprising a third tubular portion and a fourth tubular portion adjacent said third tubular portion, a second circular bearing comprising a plurality of balls engaged between a second outer circular race and a second inner circular race, third and fourth rings, said second outer and inner races being connected to said adjacent slave tubular portions, respectively, by said third and fourth rings, respectively;
slave transducing means responsive to said driving signal and operative to drivingly rotate said third ring relative to said fourth ring; and communication means linking said master transducing means and said slave transducing means for applying said driving signal to said slave transducing means;

whereby relative rotation between said first and said second adjacent tubular portions of said master arm means causes a corresponding rotation between said third and said fourth adjacent tubular portions of said slave arm means.

24. A master/slave manipulator system comprising:

master suit means comprising an upper body covering portion, master arm means connected to said upper body portion, and master leg means connected to said upper body covering portion;

said master arm means including at least a first and a second master tubular portion, and said master leg means including at least a third and a fourth master tubular portion, said master tubular portions being adjacent one another;

a plurality of master bearing members, one of said bearing members interconnecting adjacent master tubular portions of said master suit and being relatively rotatable, whereby said adjacent master portions are relatively rotatable;

master transducing means responsive to the relative rotation of each of said master bearing members and operative to provide a plurality of driving signals each said driving signal representative of the relative rotation between one set of adjacent master tubular portions;

slave suit means comprising slave arm means and slave leg means, said slave arm means including a first and a second slave tubular portion, and said slave leg means including at least a third and a fourth slave tubular portion, said slave tubular portions being adjacent one another;

a plurality of slave bearing members, one of said slave bearing members interconnecting adjacent slave tubular portions and being relatively rotatable, whereby said adjacent slave tubular portions are relatively rotatable;

a plurality of slave transducing means, each said slave transducing means responsive to the corresponding driving signal and operative to relatively rotate the corresponding slave bearing member; and communication means linking said master transducing means and said plurality of slave transducing means for applying said plurality of driving signals to the corresponding one of said plurality of said slave transducing means, whereby rotation between said adjacent master portions of said master suit causes a corresponding rotation between said adjacent slave portions of said slave suit means.

25. The master/slave manipulator system as recited in claim 24 and further comprising master carriage means for moving said master suit means, means responsive to the movement of said master carriage means and operative to provide a carriage movement signal, slave carriage means for moving said slave suit means, slave carriage moving means responsive to said carriage movement signal and operative to move said slave carriage means to correspond to the movement of said master carriage communication means for applying said carriage movement signal to said slave carriage moving means.

26. A master/slave manipulator system comprising:

means for generating a plurality of signals each of which corresponds to the relatively motion between different adjacent zones of a human limb;

slave means comprising a plurality of tubular portions each having a longitudinal axis, a first circular-shaped end occupying a plane that is perpendicular to its respective longitudinal axis, and a second circular-shaped end occupying a plane that is oblique to its respective longitudinal axis;

means for rotatably connecting said tubular portions in serial fashion, each portion being alternatively oriented wherein the first end of a tubular portion is connected to the first end of an adjacent tubular portion and the second end of a tubular portion is connected to the second end of an adjacent tubular portion;

transducing means responsive to said driving signals and operative to drivingly rotate said tubular portions and simulate the movement of a human limb;

means for applying said driving signals to said tansducing means;

said slave means simulating the movement of a limb of an operator; and said generating means including a series of rotatably interconnected tubular portions that are adapted to be worn over said limb of the operator.

* * * * *